US009335874B2

(12) United States Patent
Buelow et al.

(10) Patent No.: US 9,335,874 B2
(45) Date of Patent: May 10, 2016

(54) VALIDATED TOUCHSCREEN STYLUS INTERACTION METHOD

(71) Applicants: Todd M. Buelow, Chanhassen, MN (US); Farhad Nourbakhsh, Apple Valley, MN (US)

(72) Inventors: Todd M. Buelow, Chanhassen, MN (US); Farhad Nourbakhsh, Apple Valley, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 121 days.

(21) Appl. No.: 14/066,149

(22) Filed: Oct. 29, 2013

(65) Prior Publication Data
US 2014/0267147 A1     Sep. 18, 2014

Related U.S. Application Data

(63) Continuation-in-part of application No. 13/795,252, filed on Mar. 12, 2013, now Pat. No. 9,063,588.

(51) Int. Cl.
*G06F 3/044*     (2006.01)
*G06F 3/0354*     (2013.01)

(52) U.S. Cl.
CPC ............ *G06F 3/044* (2013.01); *G06F 3/03545* (2013.01)

(58) Field of Classification Search
CPC ... G06F 3/03545; G06F 3/044; G06F 3/0346; G06F 21/445; G06Q 20/206; G06Q 30/0609
See application file for complete search history.

(56) References Cited

U.S. PATENT DOCUMENTS

| 4,076,427 | A | 2/1978 | Anderson |
| 4,270,870 | A | 6/1981 | Hashimoto |
| 4,358,210 | A | 11/1982 | Hashimoto |
| 4,381,158 | A | 4/1983 | Garganese |
| 4,475,834 | A | 10/1984 | Bean |
| 4,955,739 | A | 9/1990 | Kageyama |
| 4,979,839 | A | 12/1990 | Hashimoto |
| 5,004,871 | A | 4/1991 | Purcell |
| 5,702,193 | A | 12/1997 | Kageyama |
| 5,999,170 | A | 12/1999 | Ooura et al. |
| 6,335,727 | B1 | 1/2002 | Morishita et al. |

(Continued)

OTHER PUBLICATIONS

Aug. 5, 2014 USPTO Office Action (U.S. Appl. No. 13/795,252).

*Primary Examiner* — Ilana Spar
*Assistant Examiner* — Charles Zheng
(74) *Attorney, Agent, or Firm* — Beck Tysver Evans, PLLC

(57) ABSTRACT

A system and method are provided for validating a signature on a touchscreen using a smart stylus. Software residing on a touchscreen device disables touch input from sources other than the stylus. In one embodiment, the stylus wirelessly transmits a stylus identifier to the touchscreen device to identify the stylus to the device. The stylus may also have a stylus tip that produces an encoded voltage pulse sequence that is used to identify the stylus to the device. A stylus ID is associated with an encoded voltage pulse. The touchscreen device can look up the stylus ID in a database, determine the encoded voltage pulse associated with the stylus ID, and determine that a voltage pulse transmitted by the stylus tip is the pulse associated with the stylus ID, thus validating the source of data input on the touchscreen.

16 Claims, 15 Drawing Sheets

(56) References Cited

U.S. PATENT DOCUMENTS

| | | |
|---|---|---|
| 7,226,229 B1 | 6/2007 | Register |
| 7,612,767 B1 | 11/2009 | Griffin |
| 8,125,469 B2 | 2/2012 | Badaye |
| 8,292,530 B2 | 10/2012 | Tamano |
| 8,648,837 B1 | 2/2014 | Tran et al. |
| 2002/0097223 A1 | 7/2002 | Rosenberg |
| 2005/0239191 A1 | 10/2005 | Prins |
| 2009/0289922 A1 | 11/2009 | Henry |
| 2011/0229245 A1 | 9/2011 | Wang |
| 2012/0242603 A1* | 9/2012 | Engelhardt et al. .......... 345/173 |
| 2012/0268429 A1 | 10/2012 | Lee et al. |
| 2012/0317194 A1 | 12/2012 | Tian |

\* cited by examiner

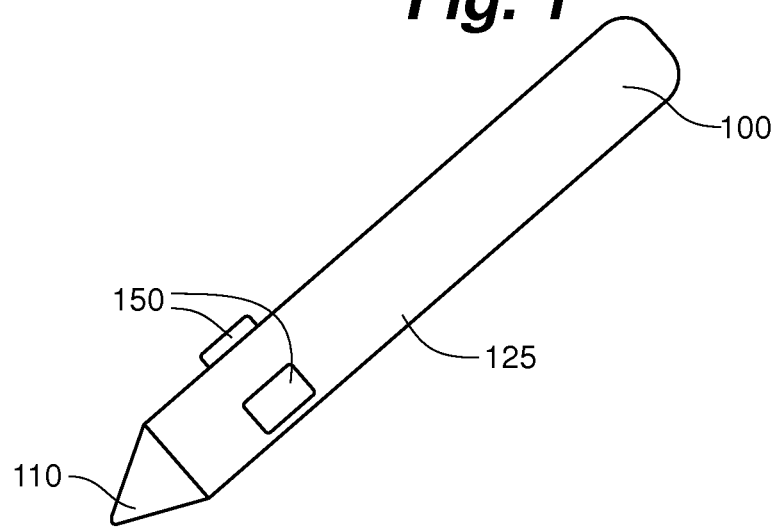
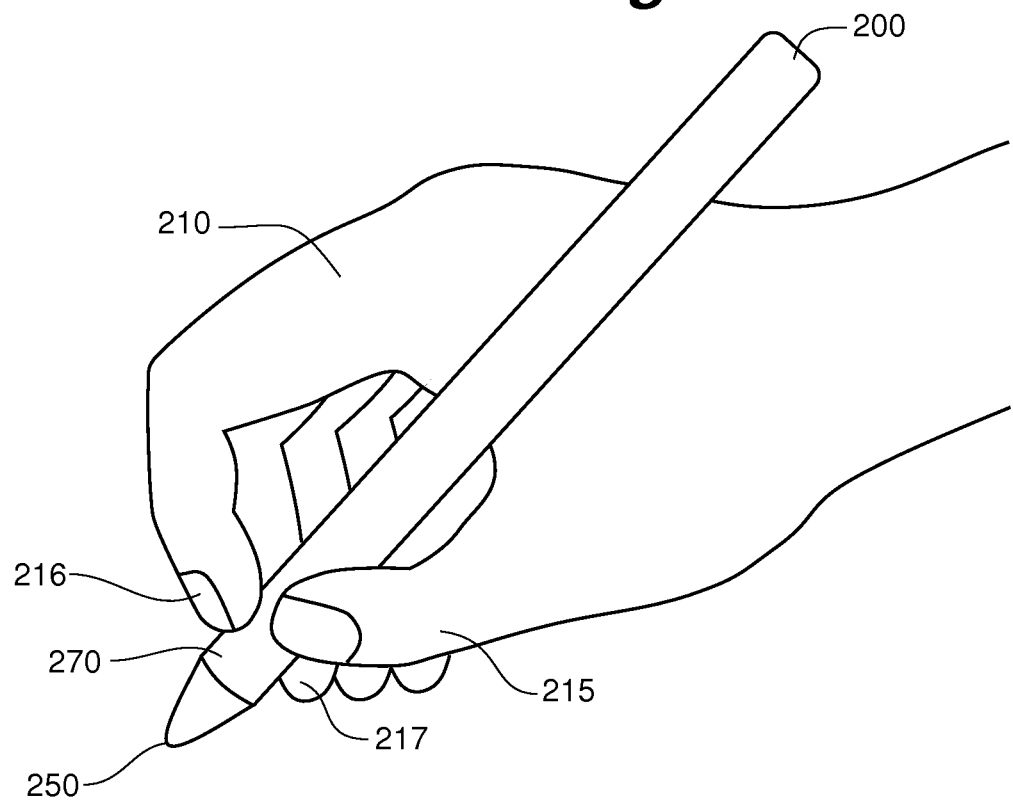

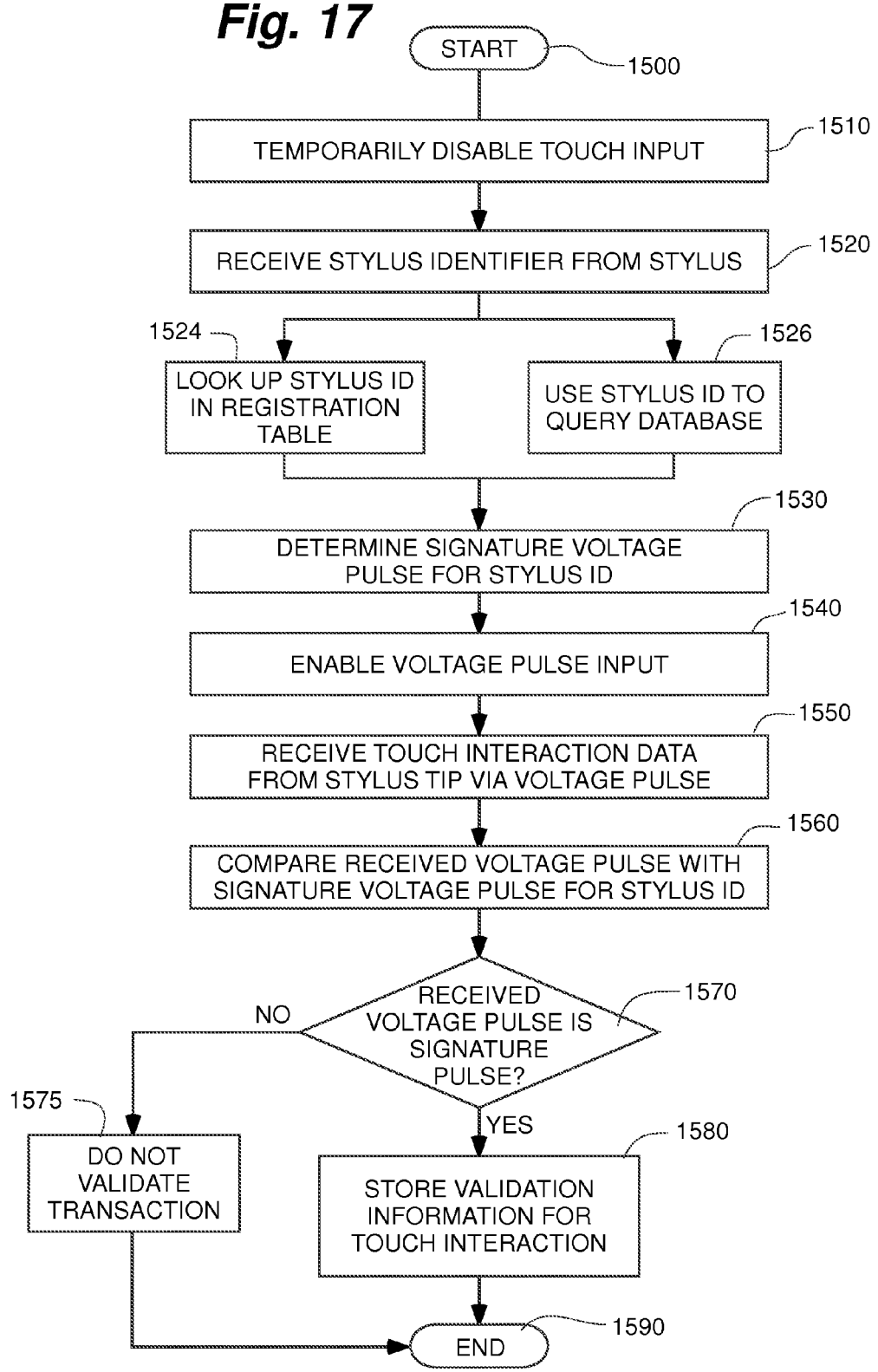

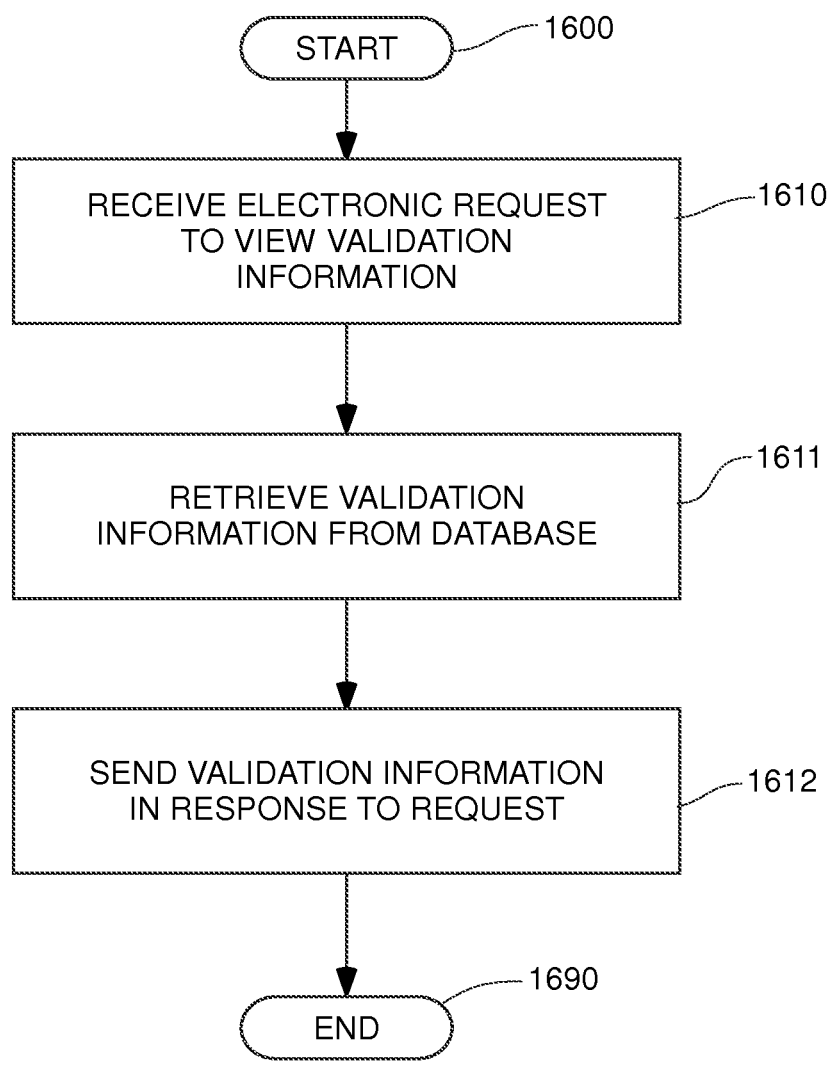

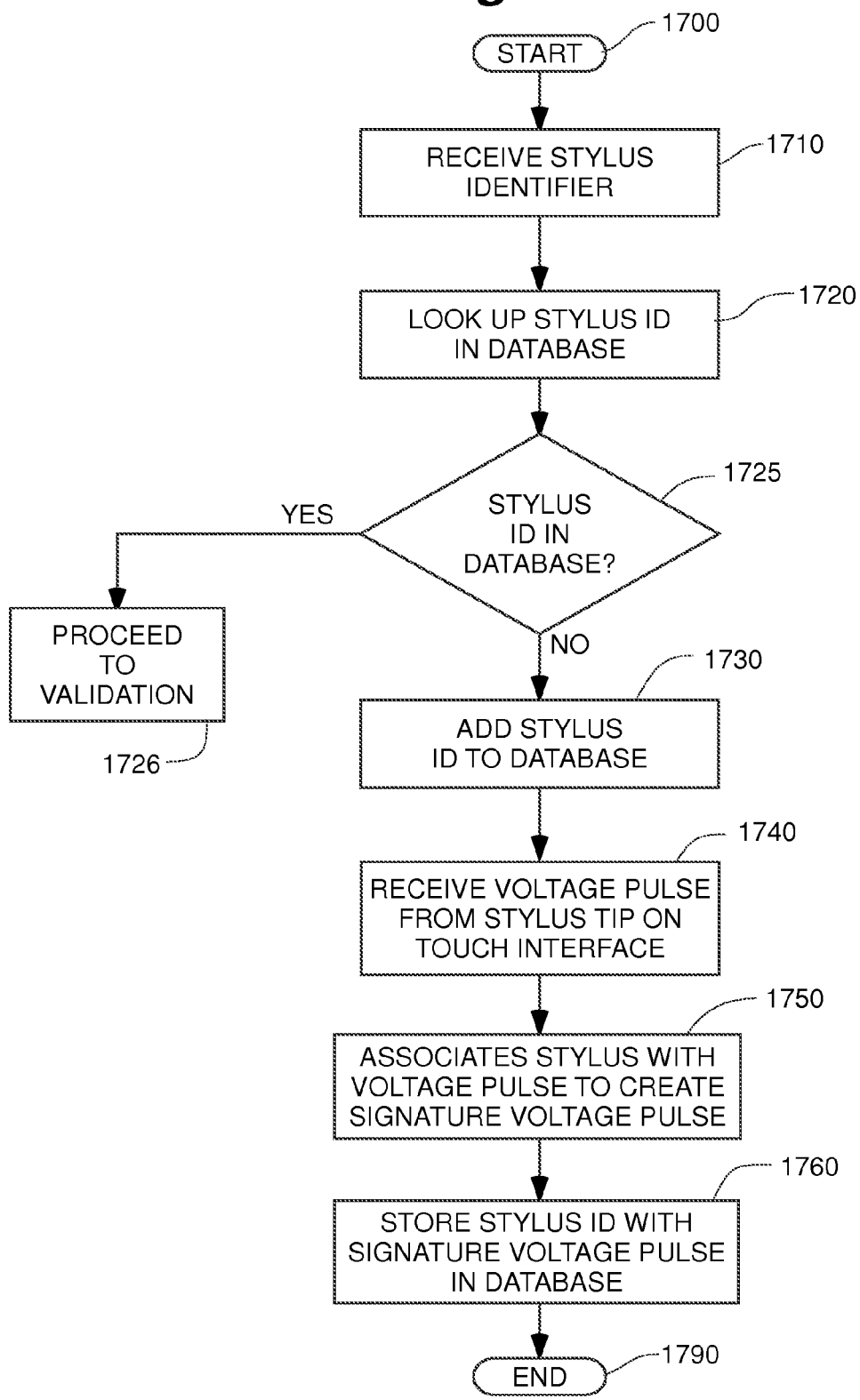

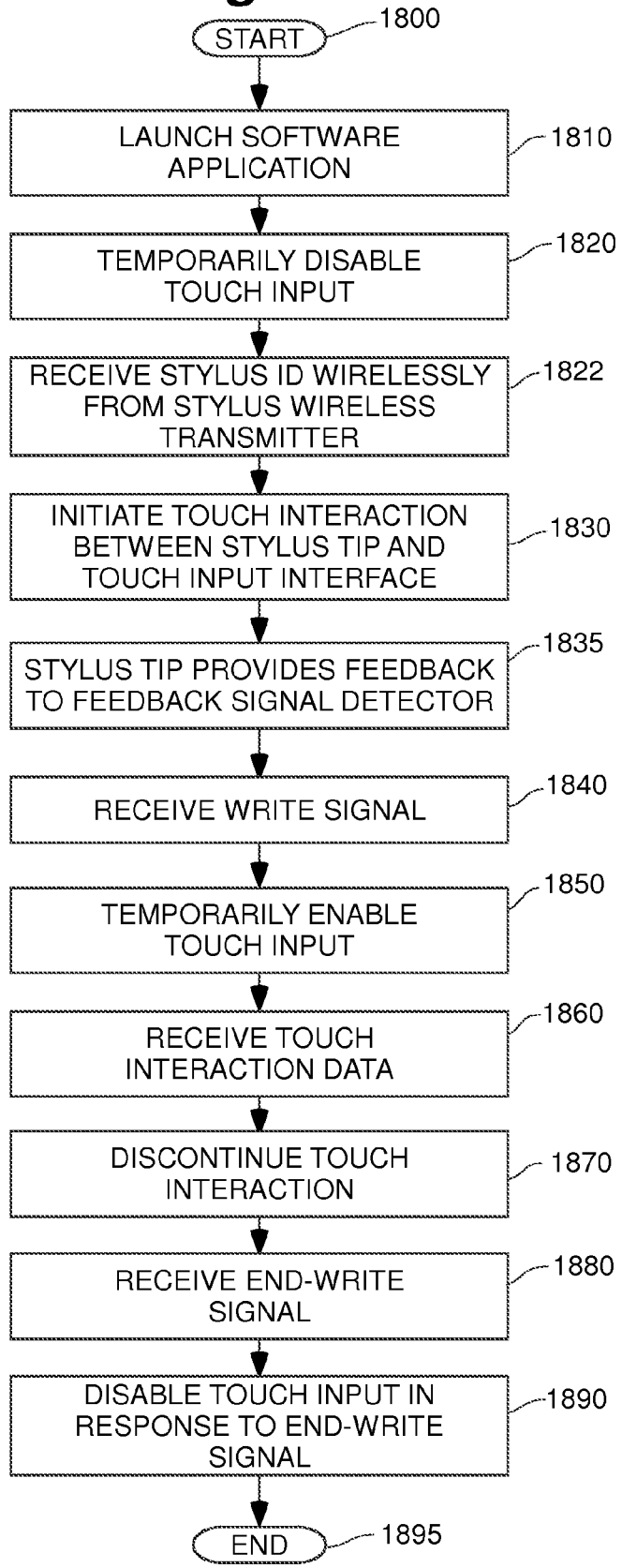

VALIDATED TOUCHSCREEN STYLUS INTERACTION METHOD

CROSS-REFERENCE TO RELATED APPLICATION

This application is a continuation-in-part of U.S. patent application Ser. No. 13/795,252, filed on Mar. 12, 2013 and entitled Grip-Enabled Touchscreen Stylus, the entirety of which is herein incorporated by reference.

FIELD OF THE INVENTION

The present application relates to the field of writing instruments for touchscreen electronic devices. More particularly, the described embodiments relate to a system and method for validating touch input from a stylus on a touchscreen.

BACKGROUND

Styluses for capacitive touchscreen devices have writing tips made of electrically-conducting material such as conducting foam or conducting rubber. Other conductors such as metal could be used, however a soft material is preferred because metal could damage a touchscreen surface. In one type of passive stylus, the stylus shaft is formed of an electrically-conducting material that transfers charge from a user's hand to the conducting tip. An alternate design (an "active stylus") may include an external power source (e.g. a battery) to provide additional functionality to the stylus. This functionality may be manifested either by providing additional means of affecting the capacitive touch interaction or by enabling communication with the touch-enabled devices by other means, supplementing the user experience.

Prior art styluses are designed to function anytime the user brings the stylus in contact with a touchscreen surface, independent of how the stylus is gripped in the user's hand. The standard writing grip for a writing instrument is a tripod grip, in which the thumb, index, and middle fingers simultaneously contact the shaft of the writing instrument. Conventional touchscreen styluses do not distinguish between a proper tripod writing grip and an incorrect grip, such as an overhand first grip that a young child may use.

SUMMARY

One embodiment of the present invention provides a touchscreen stylus having a tip that can be dynamically activated or inactivated based upon the user's grip on the stylus. The stylus may be used with capacitive touchscreens such as those found on electronic devices. Such devices include computer monitors, video screens, laptops, tablet computers, smartphones, kiosks, and other devices combining a visual display with touchscreen technology. The stylus may be used to teach a child the correct handwriting grip for a writing instrument. When a proper writing grip is achieved by correctly positioning the thumb, index, and middle fingers on the stylus shaft, the stylus tip activates and subsequently can be used with a touchscreen device. When a hand is not gripping the stylus, or if the hand is not positioned correctly, the stylus writing tip does not function with a touchscreen device.

In conjunction with the stylus, software on the touchscreen device may be provided. The software would reduce, disable, or alter the input via traditional touch from the user's finger or palm so as to encourage the user to utilize the stylus. Additionally, software could be provided in conjunction with an active stylus design that reduces, disables, or alters input from the active stylus, based upon wireless communication with the active stylus.

The software on the touchscreen device may provide a signature validation system and method. The system includes the touchscreen device, a touchscreen stylus, and software running on the touchscreen device. The stylus has a wireless transmitter and a stylus tip that produces a signature voltage pulse. The stylus transmits an identifier to the touchscreen device in order to validate that the particular stylus was used to sign the touchscreen.

BRIEF DESCRIPTION OF THE DRAWINGS

FIG. 1 is a perspective view of a grip-enabled touchscreen stylus.

FIG. 2 shows a hand demonstrating a tripod writing grip.

FIG. 17 is a flow chart showing a method for validating a touchscreen stylus interaction.

FIG. 18 is a flow chart showing a method for viewing validation information for a validated stylus transaction.

FIG. 19 is a flow chart showing a method for registering a validated stylus.

FIG. 20 is a flow chart showing an alternative embodiment of a method for validating a touchscreen stylus interaction.

DETAILED DESCRIPTION

Figure 3:
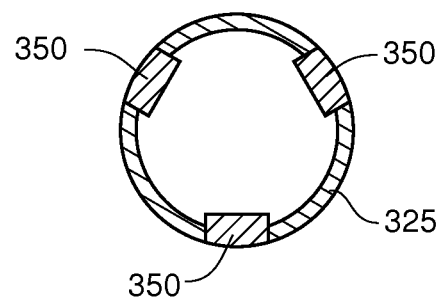
FIG. 3 is a cross-sectional view of a first embodiment of the grip-enabled stylus.

FIG. 1 shows a grip-enabled touchscreen stylus 100 that promotes the use of the tripod writing grip, in which the thumb, index, and middle fingers simultaneously contact the shaft of the writing instrument. The stylus 100 includes a tip 110 and a shaft 125. Buttons 150 around the shaft 125 are provided as a tip-activation mechanism for the stylus. The word "button" as used herein may describe a retractable mechanical button, a push-button responding to a force perpendicular to the axis of the shaft 125, a switch, a sensor, or other type of structure or mechanism placed at a predetermined location on the stylus shaft 125. In the preferred embodiment, three buttons 150 are positioned evenly around a circumference of the shaft 125. When a hand correctly grips the pen using a tripod writing grip, buttons 150 are depressed and the tip 110 becomes active and can be used to interact with a capacitive touchscreen. If not all buttons 150 are depressed, the tip 110 will not be active and will not interact with the touchscreen.

FIG. 2 shows a correct tripod writing grip of a stylus 200 by a hand 210. An index finger 216, middle finger 217, and thumb 215 of hand 210 surround the stylus shaft 270. When the hand 210 grips stylus 200 in this manner, the stylus tip 250 is activated and the stylus 200 can be used to write on a capacitive touchscreen.

The cross-sectional shape of the grip-enabled stylus can be implemented in a number of ways. FIG. 3 shows an exemplary embodiment of the grip-enabled stylus having a cylindrical shaft. Three buttons 350 are disposed around the cross-sectional circumference of shaft 325. In this embodiment, buttons 350 may be electronic sensors that are flush with an outside surface of shaft 325.

Figure 4:
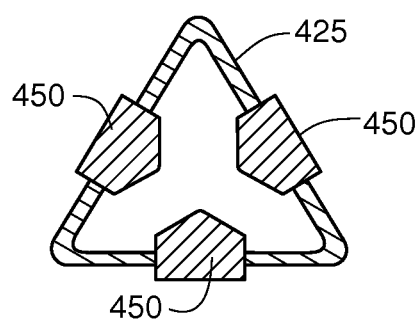
FIG. 4 is a cross-sectional view of a second embodiment.

FIG. 4 shows another exemplary embodiment of the stylus having a shaft with a triangular cross-section to promote the use of the tripod grip. Three mechanical buttons 450 partially protrude from the stylus shaft 425. The three buttons 450 are disposed evenly around the cross-sectional perimeter of the stylus shaft 425. When all three buttons 450 are simultaneously depressed by a thumb, index, and middle finger, the buttons 450 retract into the interior of the stylus shaft, causing a mechanism within the stylus shaft to activate the stylus tip for use with a touchscreen.

In alternative embodiments, the cross-sectional perimeter of the stylus could be an alternative geometric shape, such as hexagonal, octagonal, irregular, etc.

Although FIGS. 3-4 show buttons 350, 450 as being aligned in a cross-section of the stylus shaft 325, 425 (i.e., equidistant from the stylus tip), the buttons 350, 450 could be non-aligned around the stylus shaft 325, 425, such that one or more of the buttons 350, 450 may be closer to the stylus tip than other buttons. This may be the case when the stylus has a customized irregular or ergonomic cross-section.

Figure 5:
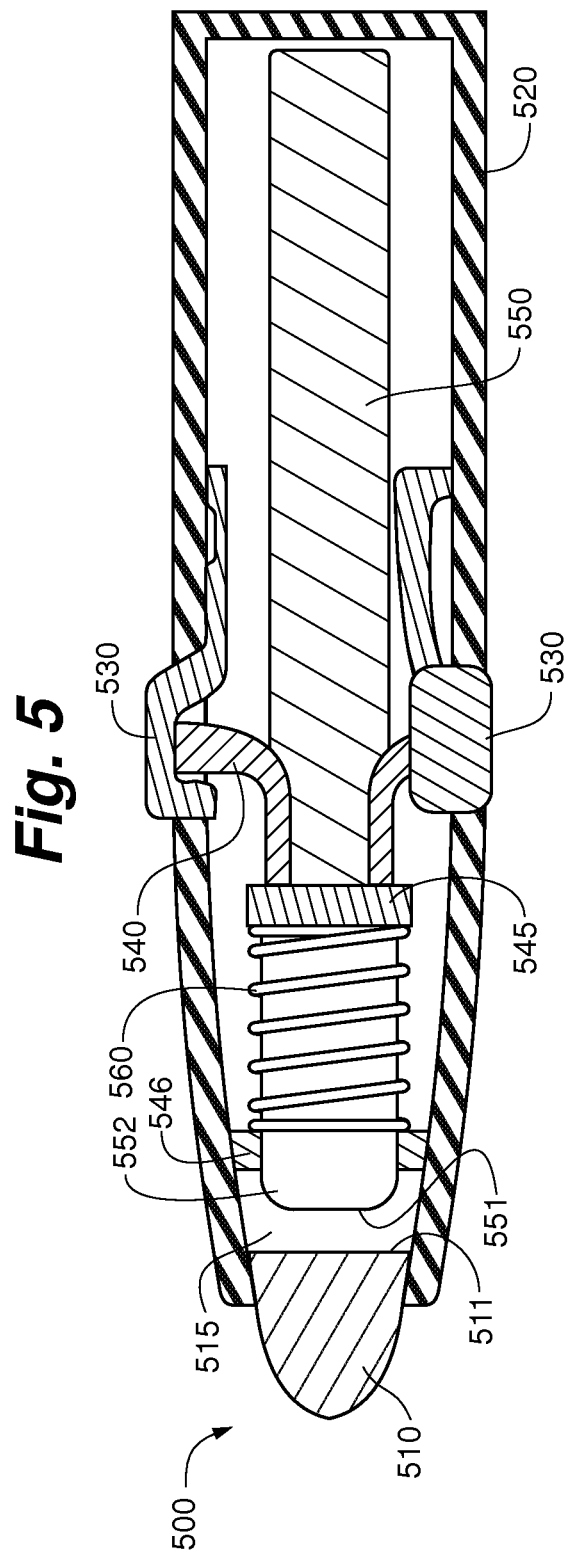
FIG. 5 is a longitudinal sectional view of a mechanical embodiment.

FIG. 5 shows a mechanical embodiment of a grip-enabled stylus 500. Stylus 500 has a tip 510 that is preferably made of an electrically-conductive foam, conductive rubber, or similar conducting material. Shaft 520 is made of an insulating material that prevents capacitive coupling between a user's hand and the tip 510 when the user grips the stylus 500. Shaft 520 could alternatively be made of a conductive material, in which case an insulating material would be placed between shaft 520 and tip 510. Stylus 500 may have a circular or triangular cross-section as shown in FIGS. 3-4, or the stylus 500 may have another cross-sectional shape. A plunger 550 made of an electrically-conducting material is situated within the shaft 520. The plunger may be formed of conducting foam, conducting rubber, metal, or other similar conducting material. A first ring 545 is fixed to plunger 550, and a second ring 546 is fixed to shaft 520. A spring coil 560 encircling plunger 550 can be compressed between rings 545, 546.

Three buttons 530 partially protrude from shaft 520 (only two buttons 530 are shown in the longitudinal cross-section of FIG. 5). Buttons 530 are constructed of an electrically-conducting material that can transfer charge from a hand to the tip 510. When depressed by fingers gripping the stylus 500, buttons 530 retract inside the shaft 520 and displace joint arms 540. Each joint arm 540 in turn provides a force to move ring 545 toward ring 546 against the resistance of spring 560. This causes a head 551 of plunger 550 to move toward and make contact with the interior end 511 of tip 510. Head 551 and interior end 511 are normally separated by a gap 515, which prevents charge flow to the stylus tip 510.

In the embodiment of FIG. 5, the stylus tip becomes active when a hand correctly gripping the stylus causes the head 551 of plunger 550 to make contact with tip 510 at interior end 511 inside of the shaft 520. The user's hand capacitively couples with the stylus tip 510 via the electrically-conducting buttons 530, joint arm 540, ring 545, and plunger 550. A capacitive touchscreen can then detect the tip 510 and register a touch when tip 510 is pressed against the surface of the capacitive touchscreen.

In a preferred embodiment of FIG. 5, all of buttons 530 must be depressed before plunger 550 makes contact with tip 510. One way this may be accomplished is by choosing a spring 560 having sufficient resistance to compression that only the combination of force from three buttons 530 can overcome the resistance of spring 560. Other mechanisms are contemplated, and will be apparent to those skilled in the art.

Optionally, in addition to the buttons 530 the stylus 500 may include an override mechanism that would eliminate the need to contact the three buttons 530 to activate the stylus. The override mechanism may be an end knock as described in U.S. Pat. No. 8,292,530, which provides a cam and a knock rod at the top end of the writing instrument to extend and retract the plunger.

Figure 6:
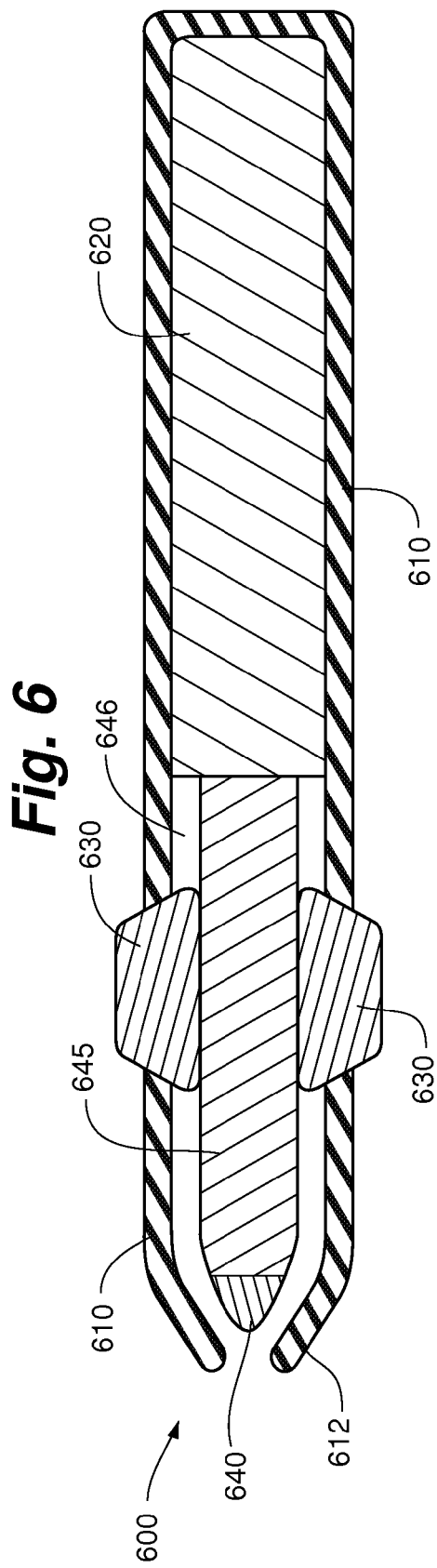
FIG. 6 is a longitudinal sectional view of a second mechanical embodiment.

FIG. 6 shows an alternative mechanical embodiment of a grip-enabled stylus 600. The stylus 600 comprises a shaft 610 having three electrically-conducting buttons 630 partially protruding from the shaft 610. Stylus 600 may have a circular or triangular cross-section as shown in FIGS. 3-4, or the stylus 600 may have another cross-sectional shape. An electrically-conducting stylus tip 640 is affixed to a plunger 645. The stylus tip 640 may be formed of a carbon-impregnated, electrically-conducting foam. The plunger 645 may be made of an electrically-conducting gel or fluid, or an amorphous, sealed vessel made of an electrically conductive material containing a gel or fluid. Alternatively, the plunger 645 may be formed of a carbon-impregnated soft foam of the correct shape and density such that it elongates substantially upon pressure from buttons 630 to extend the stylus tip 640 outside the opening 612. The plunger 645 has elastic properties, such that when a thumb, index finger, and middle finger grip the stylus 600 by depressing three buttons 630 simultaneously, the buttons 630 displace the plunger 645 within the shaft 610. Plunger 610 will then become deformed, filling the interior space 646 of shaft 610 and pushing tip 640 beyond the end 612 of shaft 610. The volume of fluid displaced by buttons 630 is preferably calibrated such that depressing only two of the buttons 630 will not displace the plunger 645 far enough for the tip 640 to emerge from the stylus end 612.

Plunger 645 may fill the entire cavity of the shaft 610, or the shaft 610 may be partially filled with an inflexible fill material 620, such as a rigid polymer, plastic, or metal material. Material 620 may also be provided to balance the weight of the stylus when a user writes on a touchscreen.

In an alternative configuration of the embodiment of FIG. 6, the stylus tip 640 could be fixed to the shaft 610 instead of being fixed to the plunger 645. In this embodiment the tip 640 and plunger 645 would normally be separated by a gap similar to gap 515 of FIG. 5. In this alternative embodiment, depressing the buttons 630 would deform the electrically-conducting fluid, gel, or vessel and cause plunger 645 to close the gap and contact the tip 640 only when all three buttons 630 are depressed.

Figure 7:
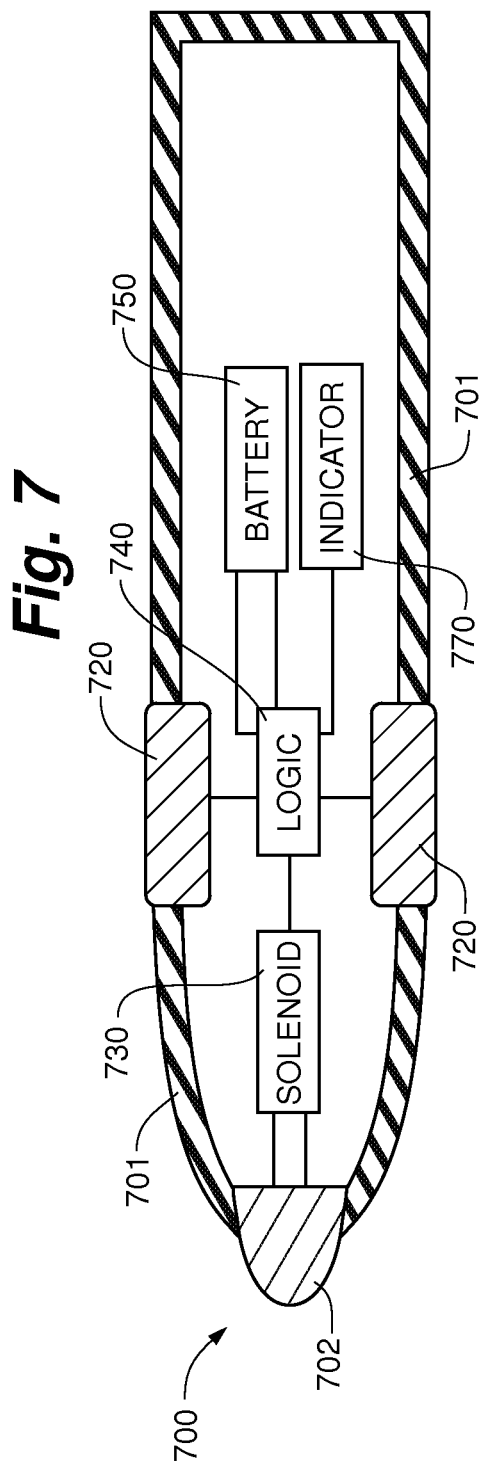
FIG. 7 is a schematic diagram of an electronic embodiment.

FIG. 7 shows an exemplary electronic embodiment of the grip-enabled stylus 700. The stylus 700 comprises a stylus shaft 701, an electrically-conducting stylus tip 702, and three sensors 720 distributed circumferentially around the shaft 701 (only two of the three sensors 720 are shown in FIG. 7). The stylus 700 may have a cross-section similar to those shown in FIGS. 3-4. A solenoid 730 is powered by a battery 750, and controlled by logic 740. Sensors 720 could be capacitive touch sensors, resistance sensors, heat sensors, pressure sensors, or light sensors. Other types of sensors could also be used. Each sensor 720 sends a continuous signal to logic 740 when the sensor 720 detects the presence of a finger touching the surface of the sensor 720. The sensor 720 stops sending the signal when the sensor 720 detects that a finger is no longer touching the sensor 720.

Logic 740 is configured to receive a signal from each of the three sensors 720. When logic 740 determines that all three sensors 720 are simultaneously pressed (e.g., by a thumb, index, and middle finger of a user's hand), the logic 740 causes the battery 750 to provide electric current to activate solenoid 730. The solenoid 730 transfers an electrical charge to the tip 702, allowing the tip 702 to be detected by a capacitive touchscreen.

In an alternative embodiment of the stylus, the logic could operate to activate the stylus when the three sensors are simultaneously contacted, then subsequently allow the stylus to remain in an ON state. In this embodiment a user would manually press an OFF button or switch to deactivate the stylus. The stylus could also contain an override mechanism such as an ON/OFF button or switch, which would allow the user to activate the stylus without simultaneously contacting the sensors 720. Onboard logic and wireless communication with the touchscreen-enabled devices may also dictate the terms of the stylus enablement/disablement should certain applications call for this functionality.

Stylus 700 may optionally have an indicator 770 to notify the user when the stylus 700 becomes active or inactive. The indicator 770 preferably produces light, sound, or vibration that can be seen, heard, or felt by a user of the stylus. For example, indicator 770 may be a light-emitting diode that is lit only when all three sensors 720 detect a contact. Such a light-emitting diode could also change colors or blink, etc. Indicator 770 could also be a speaker that emits a noise when the logic 740 first detects that all three sensors 720 have been pressed by the user's fingers.

Figure 8:
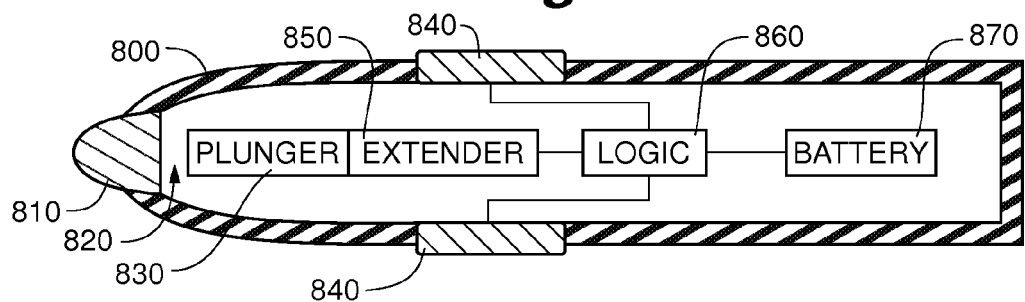
FIG. 8 is a schematic diagram showing an electromechanical embodiment.

In another embodiment of the grip-enabled stylus, a stylus actuator could be hybridized to act as an electromechanical stylus. In the embodiment of FIG. 8, the mechanical plunger-type stylus of FIG. 5 is combined with the electronic-type stylus of FIG. 7. The stylus shown in FIG. 8 has a shaft 800, a stylus tip 810, and an electrically-conducting plunger 830 physically and electrically isolated from stylus tip 810 by a gap 820. A battery 870 powers the electromechanical stylus. Three sensors 840 around a circumference of the shaft 800 each send a signal to logic 860 when the sensors 840 detect the presence of a finger on the stylus shaft. When logic 860 receives signals from all three sensors 840 simultaneously, the logic 860 causes an electromechanical extender 850 to extend the plunger 820 toward tip 810 to close the gap 820 between the plunger 830 and tip 810. The extender 850 may include a solenoid to activate tip 810. When the plunger 830 and tip 810 make contact, the stylus tip 810 becomes activated. If one or more of the sensors 840 discontinue sending a signal to logic 860, such as when a finger is no longer in contact with a sensor 840, the logic causes the extender to retract, opening the gap 820 and breaking electrical contact between plunger 830 and tip 810.

Figure 9:
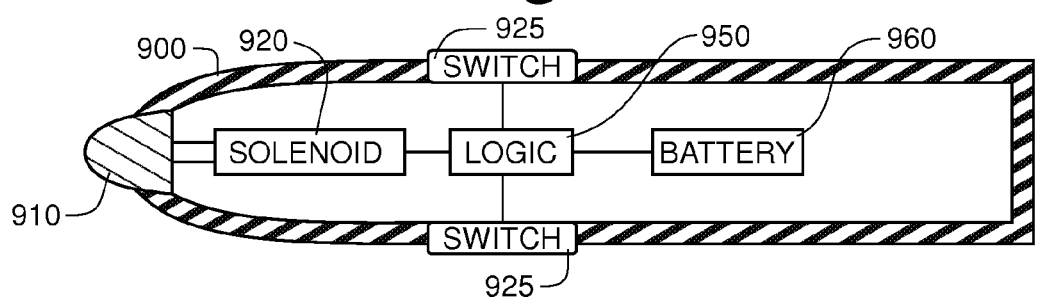
FIG. 9 is a schematic diagram showing a second electromechanical embodiment.

In another electromechanical embodiment shown in FIG. 9, a stylus includes a stylus shaft 900, a stylus tip 910, and three normally-off mechanical switches 925 around a circumference of shaft 900. A battery 960 powers the electromechanical stylus. When a hand correctly grips the stylus shaft 900 using a tripod grip, the three mechanical switches 925 connected to logic 950 signal the logic 950 to cause the battery 960 to power a solenoid 920. The solenoid 920 actuates the stylus tip 910. If the hand ceases to correctly grip the stylus, one or more of the switches 920 will return to its normally-off state, and logic 950 will cause the battery to stop providing power to solenoid 920, thus deactivating the stylus tip 910.

In an alternative embodiment of the electromechanical stylus of FIG. 9, the stylus activation buttons could comprise one mechanical switch 925 and two sensors. In this embodiment the mechanical switch could set the stylus to an ON state, and logic within the stylus would activate the solenoid 920 only when the two sensors and the mechanical switch 925 are simultaneously contacted.

Computer programming or software may be provided for use with the grip-enabled stylus. The software is preferably configured to support the use of the stylus and encourage use of the proper writing grip. One feature of the programming may prevent the computer from recognizing the user's finger as a touch command. The software may accomplish this by only responding to a touch confined in a small area, such as a few square millimeters, and disregarding touches that cover a larger area of the touchscreen.

Figure 10:
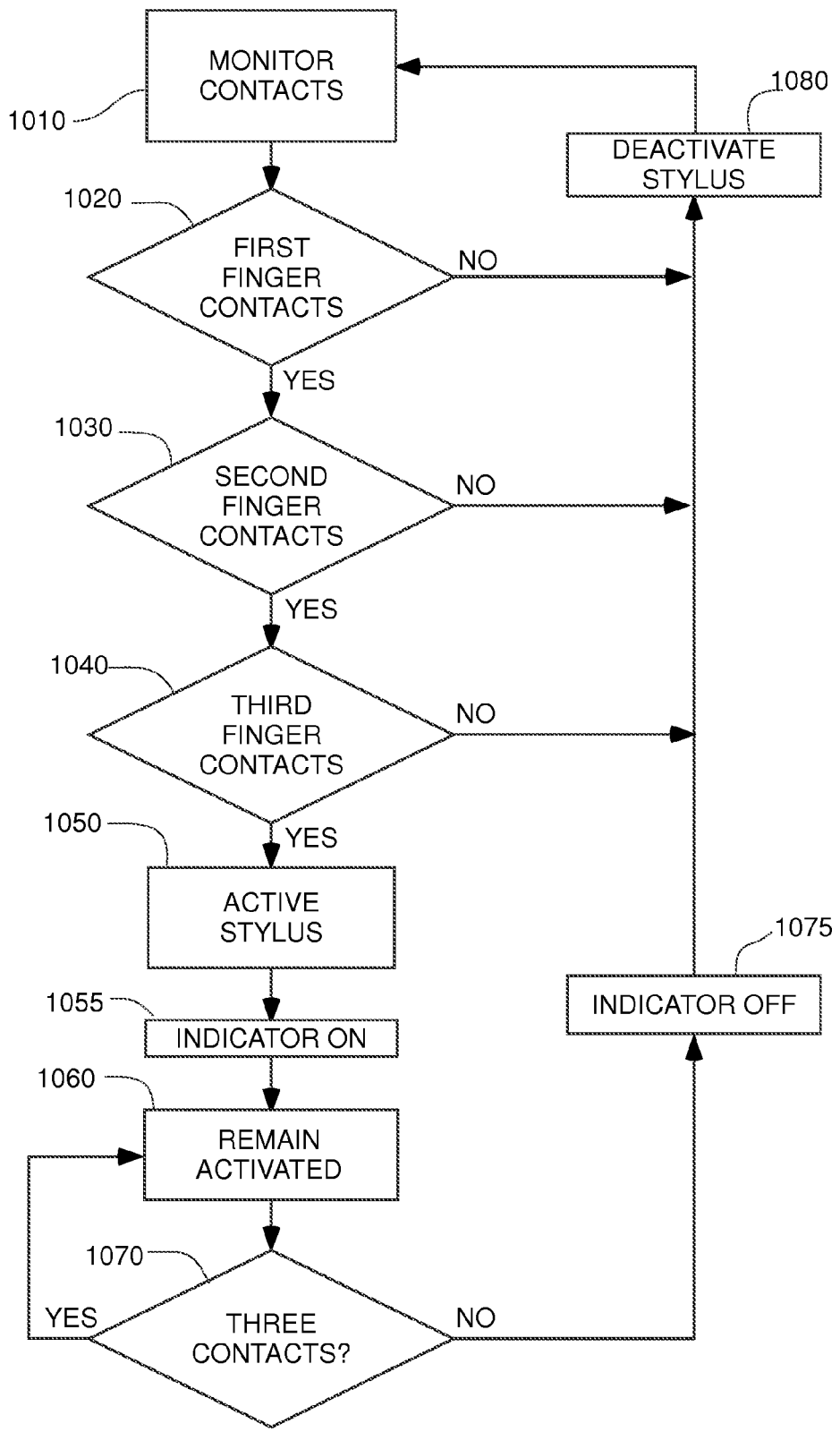
FIG. 10 is a flow chart showing a method for using a touchscreen stylus.

FIG. 10 is a flow chart showing a method for using a touchscreen stylus. The stylus has a normally-off state, in which the stylus cannot be used to write on a touchscreen electronic device. Although the method is described with reference to FIG. 5, the stylus may be an embodiment as in any of FIGS. 1-9. Although the method is presented as a series of steps, the steps may be executed in a different order, and the method may include more or fewer steps.

In step 1010, the stylus 500 is in a deactivated state and buttons 530 of the stylus 500 are monitored. In an active stylus utilizing sensors, logic 740 within the stylus 700 waits for signals from sensors 720. In a mechanical embodiment of the invention, the monitoring step 1010 consists of the stylus 500 being in the normally-off state in which charge cannot flow to the tip 510 of the stylus 500.

In step 1020, a first finger contacts a first button 530. The "button" may be one of a switch, a sensor, a mechanical actuator, or other similar structure. The button is positioned at a fixed location along the shaft 520 at an ergonomically-appropriate distance from stylus tip 510 so that the first finger contacts the button 530 when the stylus 500 is properly gripped using a tripod writing grip. If the first finger does not contact the first button 530, the stylus 500 remains in the deactivated state. If the first finger has contacted the first button 530, the method proceeds to step 1030. If the second finger has not contacted the second button 530 in step 1030, the stylus 500 remains in the deactivated state. If the second finger has contacted the second button 530, the method proceeds to step 1040. If the third finger has not contacted the third button 530 in step 1040, the stylus 500 remains in the deactivated state.

If the third finger has contacted the third button 530 in step 1040, then the method proceeds to step 1050 in which the stylus 500 is activated and can be used to write on or otherwise interact with a capacitive touchscreen. The stylus may be activated mechanically, electronically, or electromechanically. In one embodiment, in step 1055 an indicator 770 on the stylus 700 is turned on when the stylus 700 is activated. The indicator 770 may be a light, a sound, a vibration, or another type of indicator 770 that communicates to a user that the stylus tip 702 is active. The indicator 770 may be of short duration, (e.g., a brief chime), or the indicator may be of longer duration (e.g., an LED light that remains in an "ON" state while the stylus tip is activated).

In step 1060, the stylus 500 remains activated while all three buttons 530 are contacted by the three fingers. In step 1070, if the three buttons are still contacted, the stylus 500 remains in the active state. If it is determined that not all three buttons 530 are contacted, the method proceeds to step 1080, in which the stylus 500 is deactivated and will not function to write on a capacitive touchscreen. If an indicator 770 was turned on in step 1055, the indicator may be turned off in step 1075. For example, if the indicator 770 is an LED light, the LED light 770 would be turned off in step 1075.

A further embodiment disclosed herein provides a system and method for a validated touch interaction between a touch-enabled device and a touchscreen stylus. In general, a touch interaction may be defined as an event in which electrodes within the touchscreen detect a change in capacitance at the touchscreen surface, and software programming within the touch-enabled device interprets the change in capacitance as a command. For example, a particular touch interaction may cause a button to be selected, or a line to be drawn on the display screen of the touch-enabled device. The effect of a particular touch interaction is dependent upon the software programming, which typically includes a graphical user interface on the display of the touch-enabled device.

In most cases a touch interaction is an event between the touchscreen and a user's finger. However, an active or passive touchscreen stylus may also be used in a touch interaction in place of the user's finger. A validated touch interaction in the present disclosure may be a touch interaction that occurs between a touchscreen and an identified stylus. In a validated touch interaction, the software programming within the touch-enabled device detects that the touch interaction was initiated by that particular identified stylus. Information about the validated touch interaction may be stored in a memory, then retrieved from the memory at a later time to verify that the touch interaction was a validated interaction. In the present disclosure, a particular validated touch interaction is also called a "validated transaction."

Figure 11:
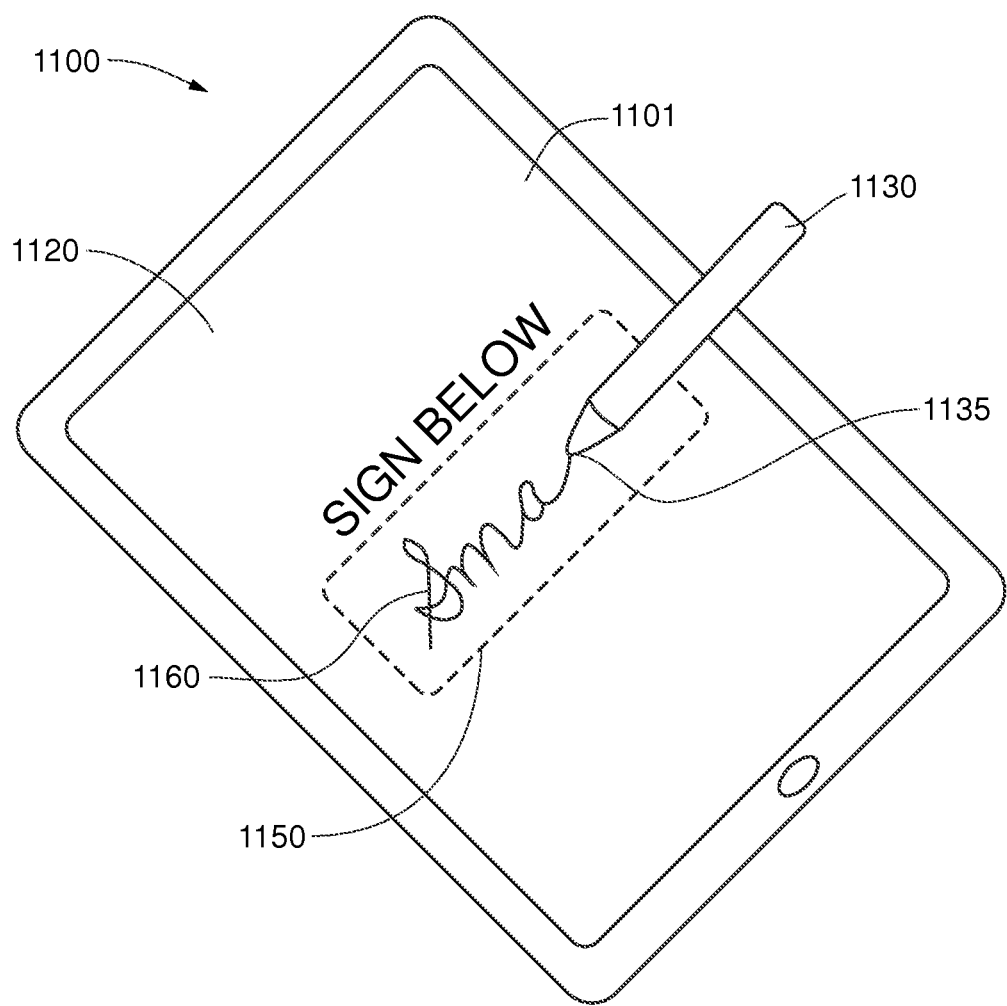
FIG. 11 is a front plan of a touchscreen stylus validation system.

FIG. 11 shows an embodiment of a validated touchscreen stylus interaction system 1100. In the system 1100, a touchscreen device 1101 has a touchscreen 1120. In a preferred embodiment, the touchscreen 1120 is a capacitive touchscreen. A stylus 1130 provides touch input data 1160 in a designated signature area 1150 on the touchscreen 1120. The tip 1135 of the stylus 1130 may provide a signature voltage pulse that is detected by the touchscreen 1120.

The voltage pulse from the stylus tip 1135 may be implemented as shown and described in U.S. Pat. No. 7,612,767, entitled "Trackpad Pen for use with Computer Touchpad," the entirety of which is herein incorporated by reference. Voltage signals from the stylus tip 1135 consist of capacitively coupled timed voltage transitions. The timing of the voltage transitions may be on the order of 1 microsecond. The voltage signals mimic the effect of a finger on a capacitive touchscreen 1120. A pulse generator 1340 within the stylus 1130 can control the timing sequence of the voltage transitions at the stylus tip 1135, and electrodes within the capacitive touch input interface 1225 can detect the timing sequence. The timing sequence of the voltage signals from the stylus tip 1135 may be uniquely associated with a particular stylus 1130. In alternative embodiments, the timing sequence of the voltage signals may be characteristic of a particular stylus 1130, but may not necessarily be an entirely unique voltage signal.

The stylus validation system in the embodiments disclosed herein can verify that an identified stylus 1130 entered a particular piece of information into the device 1101. For example, the touch input data 1160 could include a series of data entries into data fields in a form, as when a user enters personal information such as name, address, and phone number into a fillable electronic form. In an alternative embodiment, the touch input data 1160 may be an image of a signature that was created during a validated transaction between an identified stylus 1130 and the device 1101.

In one example of stylus 1130 use, the validation system can be used to sign for a package delivery. A validated transaction, such as a validated signature on a device 1101 created with an identified stylus 1130, can prove that a delivery was accepted at a particular time via the particular stylus 1130. In other implementations of the stylus system and method, the stylus 1130 could be used for a signature at a bank teller, or at a point of sale register in a retail store. For each of these implementations, the system and method described herein provides improved security, allowing a user to verify that the signature was input via a specific stylus 1130, and not added electronically after the transaction.

Figure 12:
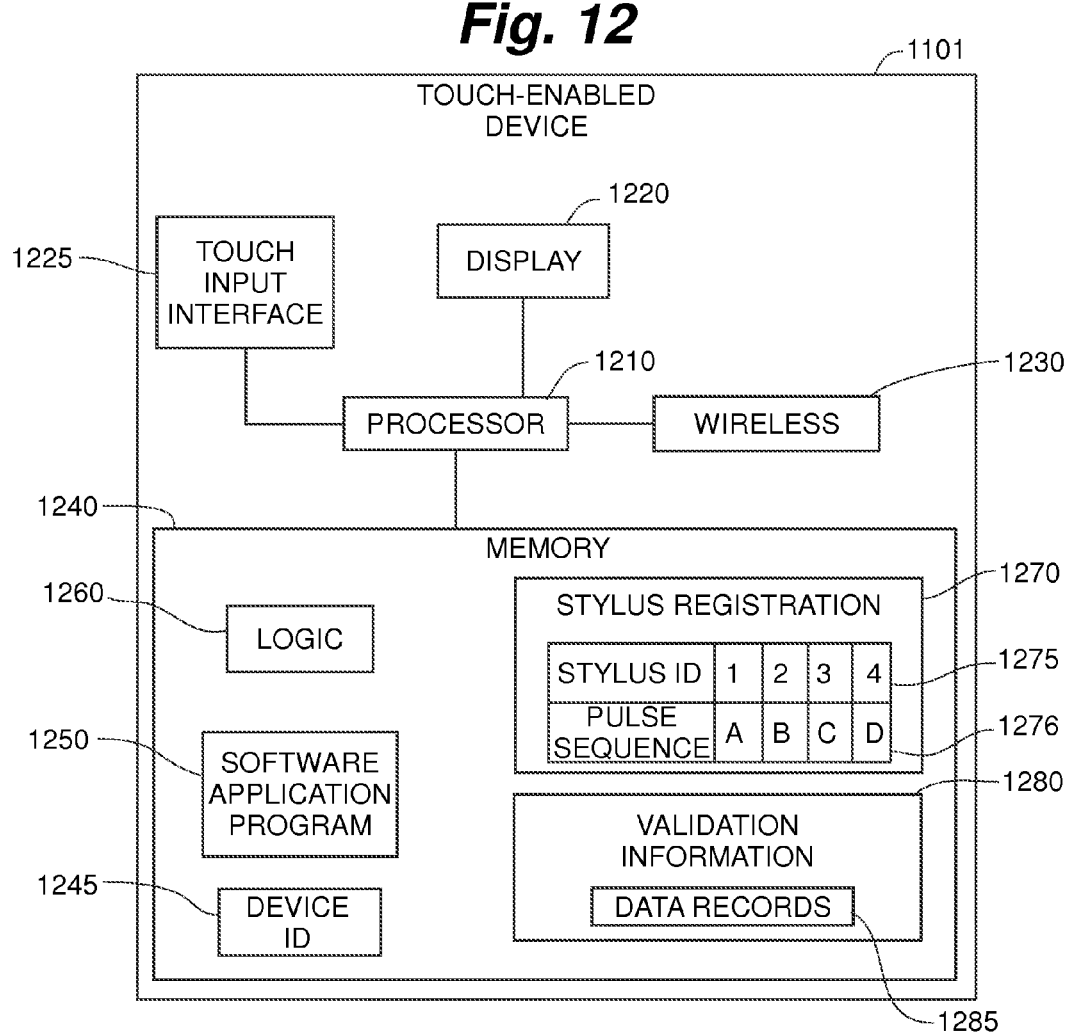
FIG. 12 is a schematic diagram of a touch-enabled device for a stylus validation system.

FIG. 12 is a schematic diagram of one embodiment of the touchscreen device 1101. A processor 1210 controls the functions of the device 1101. A display 1220 may be a visual display such as an LED or LCD flat screen, although other visual displays could also be used. A touch input interface 1225 provides a means for interacting with the device 1101. In one embodiment, the touch interface 1225 may include a grid of electrodes utilizing capacitive touch technology, however, the system and methods provided herein could also be implemented using resistive, infrared, optical, or other types of touch-sensing technology. From the perspective of a device user, the touchscreen 1120 comprises both the display screen 1220 and the touch input interface 1225.

A wireless data interface 1230 provides a connection between the device 1101 and the stylus 1130. This connection allows the stylus 1130 to send signals and other data to the device 1101, as described in more detail below. In addition, as this connection is a two-way connection, the wireless data interface 1230 could also be used to send signals and data from the device 1101 to the stylus 1130. The wireless interface 1230 can also connect the device 1101 to a remote network such as the Internet. The wireless interface 1230 may be a wireless transceiver using one or more wireless communication protocols, such as Wi-Fi, Bluetooth, radio-frequency, infrared, cellular data communication, or other types of wireless communication.

A non-transitory computer memory 1240 in the device 1101 is accessible by the processor 1210. The memory 1240 contains software logic 1260 providing computer instructions for the control of device 1101. Logic 1260 may include an operating system, BIOS, network controllers, etc. The memory 1240 also contains a software application program 1250 for implementing the stylus validation method provided herein.

A stylus registration table 1270 in the memory 1240 provides information for a plurality of recognized styluses 1130 that can be used in validated transactions in the system. In one embodiment, each stylus 1130 in the system is provided with a stylus ID record 1275. In one embodiment, each stylus ID record 1275 is associated with signature voltage pulse sequence record 1276.

Figure 13:
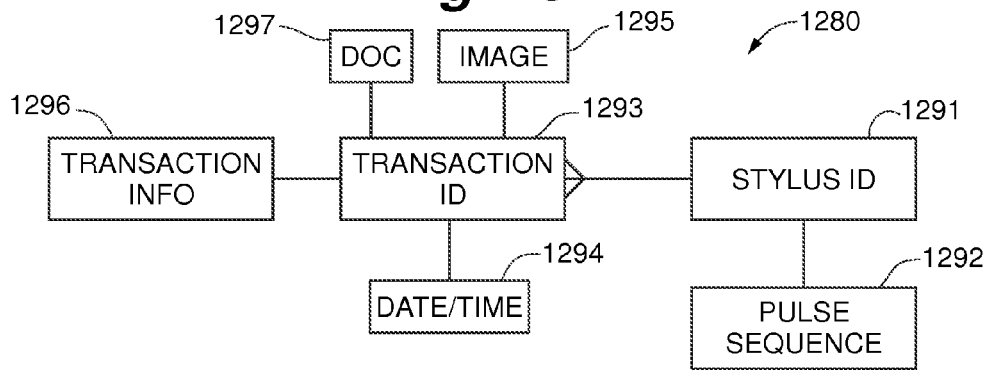
FIG. 13 is a schematic diagram of a validation information data structure.

A validation information table 1280 may be provided to store information about particular validated transactions. The validation information table 1280 stores information for a plurality of validated transactions between the device 1101 and a plurality of styluses 1130. FIG. 13 shows a data structure that may be used in the validation information table 1280 to store validation data records 1285. The validation information table 1280 in FIG. 13 includes tables or objects for a stylus ID 1291, a voltage pulse sequence 1292 associated with the stylus ID 1291, and a plurality of transaction IDs 1293 representing validated transactions for the stylus ID 1291. Each validated transaction may be associated with a date or timestamp 1294, an image 1295, transaction information 1296, and a document 1297.

Relationships (or "associations") between the database objects are represented in FIG. 13 using crow's foot notation, in which a single object such as stylus ID 1291 can be associated with a plurality of transaction IDs 1293. Associations or relationships between the database entities shown in FIG. 13 can be implemented through a variety of known database techniques, such as through the use of foreign key fields and associative tables in a relational database model. In one embodiment, each data record 1285 stored in the validation information table 1280 includes at least one of a stylus ID 1291 and a voltage pulse sequence 1292. Furthermore, each data record 1285 preferably includes one or more of a transaction ID 1293, a date/time 1294, an image 1295 or document 1297 corresponding to the touch interaction data 1160, and transaction information 1296.

The transaction information 1296 may include such information as a name and address of a user, a package tracking number, a bank account or credit card number, or other types of information. It is to be understood that the type of information stored in the data records 1285 will depend upon the specific application of the validation system. The validation information database 1280 could include more or fewer types of database entities, depending upon the application. In an embodiment to be discussed in relation to FIGS. 15 and 16, the validation information data records 1285 could also be transmitted via wireless interface 1230 to be uploaded to a remote server database accessible via the Internet. Stylus registration information 1270 could also be stored at a remote location and accessed through the Internet via the wireless network connection 1230 of the device 1101.

Figure 14:
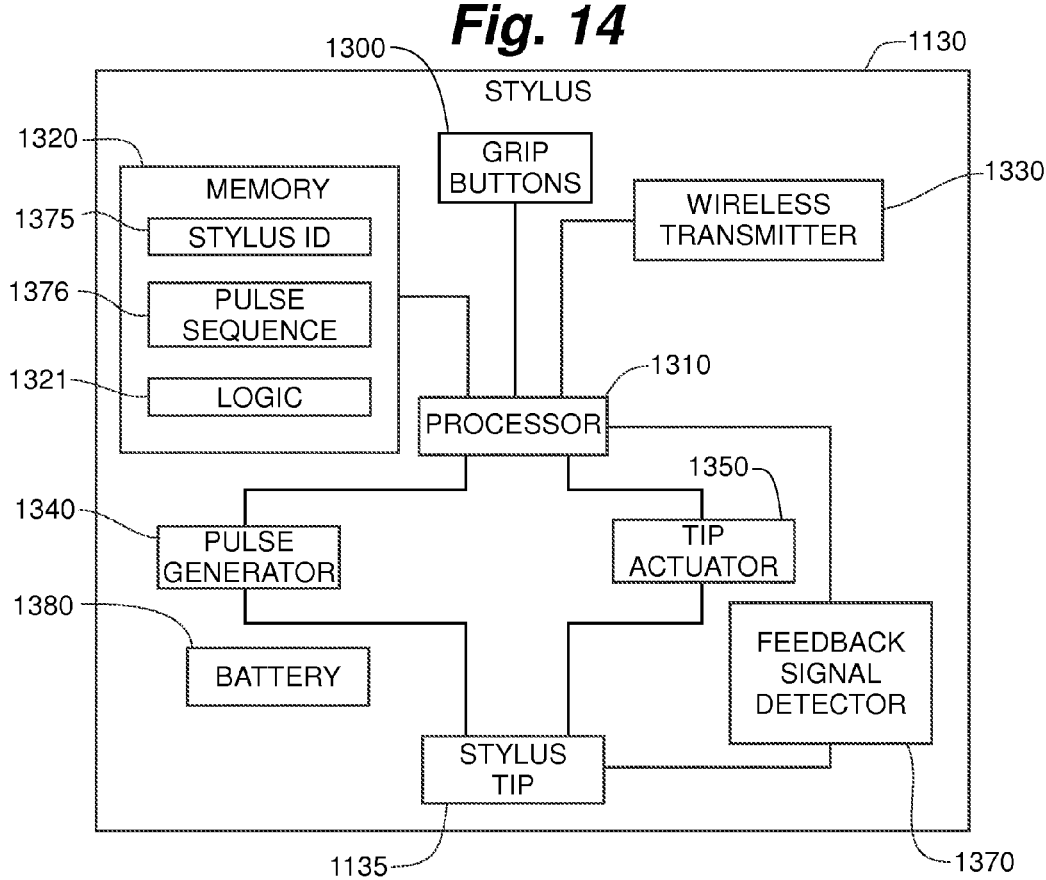
FIG. 14 is a schematic diagram of a stylus for a stylus validation system.

FIG. 14 shows a schematic diagram of an embodiment of the stylus 1130. The stylus 1130 contains a processor 1310 accessing a non-transitory computer memory 1320 having operating logic 1321 to implement the various functions performed by the stylus 1130. Alternatively, it is contemplated that the stylus 1130 could be implemented using firmware or dedicated chipsets that would eliminate the need for a general purpose processor 1310. The memory 1320 also holds identifying information for the stylus 1130, including one or both of a stylus ID 1375 and an encoded voltage pulse sequence 1376. The stylus ID 1375 may uniquely identify the stylus 1130, or the encoded voltage pulse sequence 1376 may uniquely identify the stylus 1130, or the combination of the stylus ID 1375 and voltage pulse sequence 1376 may uniquely identify the stylus 1130.

The stylus 1130 may also have one or more grip buttons 1300. As explained above, the processor 1310 can utilize the grip buttons 1300 to ensure that the stylus 1130 is being held by a user using a proper grip before the stylus tip 1135 is activated.

A wireless data interface 1330 is used to transmit the stylus ID 1375 to the device 1101. The wireless interface 1330 can also be used to send a write signal or end-write signal to the device 1101 to direct the device 1101 to accept or not accept touch input data 1160 at the touchscreen 1120.

A voltage pulse generator 1340 is controlled by the processor 1310. The pulse generator 1340 includes timing circuitry to control the voltage transitions that comprise the voltage pulse sequence 1376. A tip actuator 1350 causes the stylus tip 1135 to become active in order to provide touch interaction with touchscreen 1120. The tip actuator 1350 may be an electronic actuator, a mechanical actuator, or an electromechanical tip actuator. The tip actuator 1350 may alternatively be an actuator that is enabled when a stylus user correctly grips the stylus using a tripod grip, as indicated by buttons 1300. In some embodiments, the stylus could be a passive stylus, in which case the tip actuator 1350 could be omitted. A battery 1380 is provided to power the electrical components of the stylus 1130.

A feedback signal detector 1370 could also be provided in the stylus 1130. The feedback signal detector 1370 detects when the stylus tip 1135 is contacting a touchscreen 1120. The signal detector 1370 could detect a change in the capacitance at the stylus tip 1135 when the tip 1135 contacts the touchscreen 1120. Alternatively, the detector 1370 could be a pressure sensor detecting that the stylus tip 1135 is exerting pressure on the touchscreen 1120. Other types of signal detector 1370 are contemplated and will be evident to one of ordinary skill in the art.

Each stylus 1130 used in the system and method of the various embodiments must be able to be uniquely identified. A particular stylus 1130 can be identified using a one-factor stylus identification or a two-factor stylus identification.

With reference to FIGS. 11, 12, 13, and 14, in a first embodiment of a one-factor stylus identification system, each stylus 1130 is provided with a unique stylus ID 1375. In this embodiment, the stylus 1130 would send the unique stylus ID 1375 via a wireless interface 1330 to the device 1101. The device 1101 could then look up the stylus ID 1375 in the stylus registration table 1270 to confirm that the stylus 1130 is a registered stylus. If the stylus 1130 is a registered stylus, the system can validate a transaction. If the stylus 1130 is not a registered stylus, no transaction can be validated for that particular stylus 1130.

In a second embodiment of a one-factor stylus identification system, each stylus 1130 in the system would be assigned its own encoded voltage pulse sequence 1376 transmitted by the tip 1135 of the stylus 1130. The voltage pulse sequence 1376 could be uniquely assigned to a particular stylus 1130. The device 1101 could capture the pulse sequence 1376 transmitted from the stylus tip 1135, then perform a lookup of the captured pulse sequence 1376 in the pulse sequence data record 1276 in the stylus registration table 1270 to confirm the registration of the stylus 1130. If the stylus 1130 is registered, then a transaction can be validated. If the stylus 1130 is not registered in the registration table 1270, then no transaction can be validated with that particular stylus 1130.

In a first embodiment of a two-factor system of stylus identification to be discussed in relation to FIG. 17, each stylus 1130 is provided with both a stylus ID 1375 for transmission over a wireless interface 1330 and an encoded voltage pulse 1376 for transmission via timed voltage transitions from the stylus tip 1135. The two-factor method confirms both the presence of the stylus 1130, and that the particular stylus tip 1135 of the stylus 1130 is the source of touch interaction data 1160 on the touchscreen 1120. This two-factor stylus identification system provides increased confidence that a particular stylus 1130 was used in the validated touch interaction.

In a second embodiment of a two-factor stylus identification system, the stylus 1130 is provided with a stylus ID 1375 but no encoded voltage pulse 1376. Instead, a feedback signal detector 1370 connected to the stylus tip 1135 detects that the stylus tip 1135 is in contact with a touchscreen 1120. In response to the detection, stylus 1130 transmits a "write" signal via the wireless interface 1330, indicating that the stylus tip 1135 is contacting a writing surface. When the feedback signal detector 1370 at stylus tip 1135 detects that the stylus tip 1135 is no longer contacting the touchscreen 1120, the stylus 1130 transmits an "end-write" signal via the wireless interface 1330, indicating that the stylus tip 1135 is not contacting the touchscreen 1120. The write signal could be a continuous signal that is transmitted by the wireless interface 1330 whenever the stylus tip 1135 is in contact with the touchscreen 1120. In this case, the "end-write" signal would simply be the discontinuing of the write signal. Alternatively, the write signal could be a first discrete signal sent when the feedback signal detector 1370 makes a detection that the stylus tip 1135 is in contact with the touchscreen 1120, and the end write signal could be a second, different discrete signal sent when the feedback signal detector 1370 makes a detection that the stylus tip 1135 is not in contact.

Figure 15:
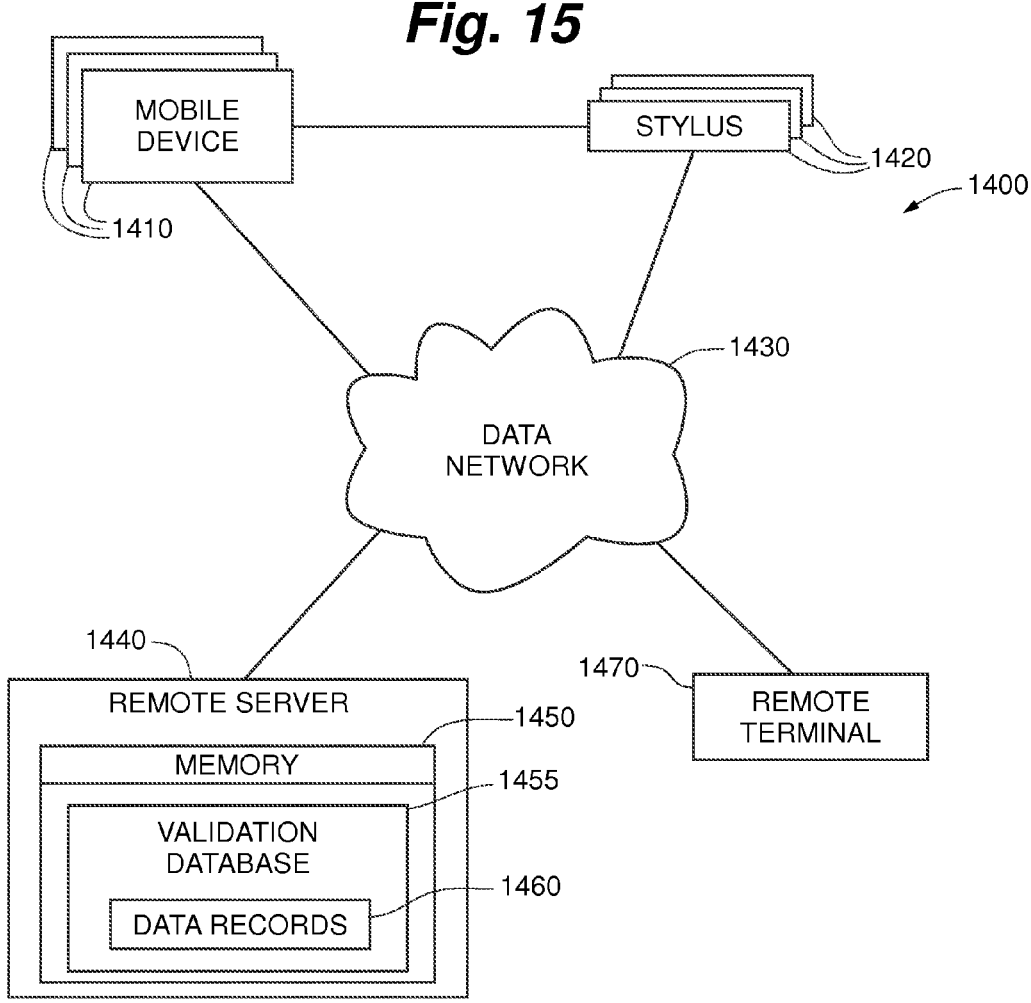
FIG. 15 is a schematic diagram of a touchscreen stylus validation system over a data network.

FIG. 15 shows an embodiment of a stylus validation system 1400 in a computer network. The system 1400 allows a user at a remote terminal 1470 to access validation data records 1460 showing validated stylus transactions between a plurality of mobile devices 1410 and a plurality of smart styluses 1420. The remote terminal 1470 may be a computer remote from mobile devices 1410. In other embodiments, the mobile devices 1410 could also act as a remote terminal to access the validation data records 1460. The mobile devices 1410 can access a data network 1430 such as the Internet to transmit validation information from the mobile device 1410 to a remote server 1440. The styluses 1420 may also be able to access the data network 1430.

The remote server computer 1440 has a tangible, non-transitory computer memory 1450 storing a validation database 1455 with a plurality of validation data records 1460 for validated transactions between the mobile devices 1410 and the styluses 1420.

Figure 16:
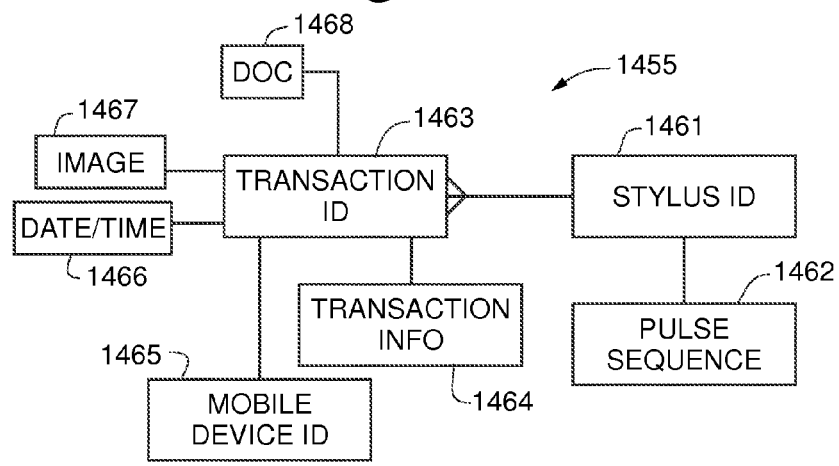
FIG. 16 is a schematic diagram of a validation database structure.

FIG. 16 shows an exemplary embodiment of a data structure for the validation database 1455. Validation data records 1460 may contain a number of different data objects related to validated transactions between mobile devices 1410 and styluses 1420. As indicated by the crow's foot notation, a stylus ID 1461 is associated with a plurality of transaction IDs 1463, each representing a validated transaction for a particular stylus 1420. Each validation data record 1460 may relate a particular stylus ID 1461 with a voltage pulse sequence 1462.

Each transaction ID 1463 may be associated with a date or timestamp 1466; a mobile device ID 1465 identifying the particular mobile device 1410 involved in the transaction; transaction information 1464; and an image 1467 or document 1468 of touch interaction data. Transaction information 1464 may include personally identifying information for the stylus user, a package delivery number, and any other information relevant to the validated transaction.

A user at a remote terminal 1470 can query the database 1455 to view validation data records 1460 for one or more validated transactions. The query term or terms used to query the database 1455 could be one or more of a transaction ID 1463, a stylus ID 1461, a pulse sequence 1462, a mobile device ID 1465, transaction information 1464, date or timestamp 1466, and other such query terms. The database query returns a query result including information about one or more validated transactions recorded in the database 1455. The returned result verifies to the user at remote terminal 1470 that a particular touchscreen interaction at a mobile device 1410 was performed with the particular identified stylus 1420. In a preferred embodiment, this type of database query could also be performed at any of the mobile devices 1410 in the system. Because each stylus ID 1461 may be associated with a plurality of transactions 1463, it is contemplated that a single database query could return a list of multiple results, for example a list of all validated transactions for a particular identified stylus 1420.

FIGS. 17-20 are flow charts showing methods to be used with various embodiments of the present disclosure. The embodiments of the methods disclosed in FIGS. 17-20 herein are not to be limited to the exact sequence described. Although the methods presented in the flow charts of FIGS. 17-20 are depicted as a series of steps, the steps may be performed a different order, and in different combinations. The methods could be performed with more or fewer steps. One or more steps in the methods of FIGS. 17-20 could be combined with steps of methods shown in other of FIGS. 17-20.

FIG. 17 is a flow chart showing a method 1500 for validating a touchscreen stylus interaction in a two-factor validation system utilizing a stylus ID and an encoded voltage pulse. In the method 1500 a uniquely-identified touchscreen stylus 1130 interacts with a touchscreen 1120 of a mobile device 1101 in a validated transaction. In step 1510, touch input on the touchscreen 1120 is temporarily disabled by software 1250 running on the device 1101. The touch input interface 1225 need not be entirely disabled. It is sufficient that the software 1250 does not recognize touch input data 1160 in at least one section of the touchscreen 1120. For example, a designated signature area 1150 on the touchscreen 1120 could be dedicated to only validated touch interactions from the identified stylus 1130, while another part of the screen responds to any touch interaction. The touchscreen 1120 will remain in this temporarily disabled state until a specific event occurs to cause the software 1250 running on the device to accept touch input data 1160 in the designated signature area 1150.

In step 1520, the stylus 1130 transmits a stylus identifier 1375 that is received by the mobile device 1101. In a first embodiment, the stylus identifier 1375 is sent by the stylus wireless interface 1330 and received by the mobile device wireless interface 1230. In an alternative embodiment, the stylus identifier 1375 could be transmitted to the mobile device 1101 through the touchscreen input interface 1225 by way of a voltage pulse emitted from the stylus tip 1135.

In step 1524 the mobile device 1101 looks up the stylus ID 1375 in a stylus registration table 1270 on the mobile device 1101 to determine whether there is a stylus ID record 1275 for the stylus 1130. If the stylus ID 1375 is found in the stylus registration table 1270, then the stylus 1130 is a registered stylus. Alternatively, in step 1526 the mobile device 1101 could use the stylus ID 1375 to query a validation database 1455 on a remote server 1440 to determine whether the stylus 1130 is a registered stylus.

In step 1530, a signature voltage pulse record 1276 corresponding to the stylus ID record 1275 is determined. The voltage pulse record 1276 is the voltage pulse that the software 1250 on the mobile device 1101 uses to validate the transaction. In the alternative embodiment in which the stylus ID 1375 is used to query the validation database 1455, the signature voltage pulse would be returned from the remote server 1440 as a query result.

In step 1540, the touchscreen input interface 1225 is enabled. In one embodiment, the software 1250 running on the mobile device 1101 is programmed to only accept touch input data 1160 received as an encoded voltage pulse from a stylus tip 1135. Alternatively, the software 1250 could be programmed to recognize any type of touch interaction, for example from a finger or non-validated stylus. In this case, if the touchscreen input interface 1225 does not receive an encoded voltage pulse, the touch interaction cannot be validated.

In step 1550 touch input data 1160 from the stylus tip 1135 is received at the touch input interface 1225. The touch input data 1160 is received as an encoded voltage pulse 1376. In step 1560 the received encoded voltage pulse 1376 is compared with the signature voltage pulse 1276 determined in step 1530. At step 1570, if the software 1250 determines that the received voltage pulse 1376 is not the correct signature voltage pulse 1276 corresponding to the stylus ID record 1275, the method will proceed to step 1575, and the transaction will not be validated.

If it is determined that the received voltage pulse 1376 is the signature voltage pulse 1276, then the method proceeds to step 1580, in which validation information is stored for the touch interaction. The validation information may be stored in validation table 1280 on the mobile device, or may be transmitted to a remote server 1440 to be stored on a validation database 1455. The validation information may be stored in the validation information data structure 1280 with data objects corresponding to one or more of a stylus ID 1291, pulse sequence 1292, transaction ID 1293, date and timestamp 1294, an image of the touch input data 1295, a document of the touch input data 1297, and transaction information 1296.

In an alternative embodiment of the method 1500, the step 1510 of disabling the touch input and step 1540 of enabling the touch input could be omitted. In such an embodiment, the stylus tip 1135 would be used in a touch interaction with the touchscreen 1120 in step 1550. If the voltage pulse 1376 received in step 1550 is the signature voltage pulse 1276 identified in step 1530, the interaction is validated. If the signature voltage pulse is not received in step 1550, the software 1250 running on the mobile device 1101 will simply not validate the transaction. For example, the software 1250 could show an error message on the display screen saying that the transaction was not validated.

In another embodiment, the touchscreen 1120 would always accept touch input, and would rely only on the voltage pulse signal to identify a stylus 1130 and validate a transaction. In this embodiment, steps 1510-1540 would be skipped. The method 1500 begins with receiving touch input data as an encoded voltage pulse 1376 at step 1550. Step 1560 would compare the received encoded voltage pulse data 1376 to a signature voltage pulse record 1276 in the stylus registration data 1270. If a match is found, the stylus 1130 would be verified by step 1570, and validation information for the touch interaction would be stored at step 1580. If the received voltage pulse 1376 was not found in registration data 1270, the transaction would not be validated at step 1575.

The steps of method 1500 could occur in a different order than as presented in FIG. 17. For example, the device 1101 could receive both the stylus ID 1375 and voltage pulse 1376 approximately at the same time, and use both the stylus ID 1375 and voltage pulse 1376 to do the lookup or query in steps 1524 and 1526.

FIG. 18 is a flow chart showing a method 1600 for viewing validation information for a validated transaction. The validation information may be viewed at a remote terminal 1470 over a remote data network 1430. In step 1610, an electronic request is received to view validation information. The request may be sent as a query to a remote server 1440 having a validation database 1455. The query terms may include one or more of a stylus ID 1461, a mobile device ID 1465, transaction ID 1463, pulse sequence 1462, transaction information 1464, or other such information that may be stored in the validation database 1455. In step 1611, validation information is retrieved from the database 1455 as a query result. In step 1612, the validation information is sent back to the remote terminal 1470 or mobile device 1410 in response to the request in step 1610. The validation information verifies to the recipient that a particular mobile device 1410 was signed with the particular identified stylus 1430.

FIG. 19 is a flow chart showing a method 1700 for registering a validated stylus. The method 1700 may be used in combination with method 1500 if the stylus 1130 is not a registered stylus. In step 1710, a stylus identifier 1375 is received by the mobile device 1101. The stylus identifier 1375 may be received via a wireless signal transmitted by a wireless transmitter 1330 within the stylus 1130. In an alternative embodiment, the stylus ID 1375 may be received via the stylus tip 1135 as a series of voltage pulses 1376. In step 1720, the stylus ID 1375 is used to look up a registration for the stylus 1130 in a registration table 1270 on the mobile device 1101, or on a validation database 1455 on a remote server memory 1450. If the stylus ID 1375 is found in the registration table 1270 or the server database 1455 in step 1725, then the method proceeds to step 1726, in which the transaction is validated, for example using the method 1500.

If the stylus ID 1375 is not found in the registration table 1270 or the validation database 1455, the method proceeds to step 1730, in which the stylus ID 1375 is added as a stylus ID record 1275 to the registration table 1270. Alternatively, the stylus ID 1375 may be added in the validation database 1455 as a stylus ID object 1461.

In step 1740, the touch input interface 1225 receives touch input data 1160 from the stylus tip 1135 via a sequence of voltage pulses 1376. The voltage pulses 1376 are received at the touch input interface 1225, and used by the software 1250 to determine a signature voltage pulse pattern 1276 for the stylus.

In one embodiment, a pulse generator 1340 within the stylus 1130 may cause the voltage pulse 1376 to repeat continuously without regard to whether the stylus 1130 is contacting the touchscreen 1120. If the user alternately lifts the stylus tip 1130 off of the touchscreen 1120 and lowers the tip 1135 to contact the touchscreen 1120 once again, the software 1250 on the mobile device 1101 will collect the stream of voltage pulses 1376 from the stylus tip 1135, then piece the stream of voltage pulses 1376 together to look for a repeating sequence.

In step 1750, after the voltage pulse pattern 1376 has been identified, the voltage pulse 1376 is associated with the stylus ID 1375 in the registration table 1270, and stored as stylus ID data record 1275 and signature voltage pulse data record 1276. The voltage pulse 1376 received in step 1740 then becomes the recognized signature voltage pulse for that particular stylus ID. Significantly, in the method 1700, the signature voltage pulse 1276 does not need to be unique. A stylus having a first stylus ID could have the same signature voltage pulse as a second stylus having a second stylus ID, because in a two-factor stylus identification system, a particular stylus is uniquely identified by the combination of the stylus ID and pulse sequence.

In step 1760, the stylus ID data record 1275 and signature voltage pulse data record 1276 are stored together in the registration table 1270 or the validation database 1455. The stylus ID 1375 and voltage pulse sequence 1376 can then be recognized the next time the stylus 1130 is used in a validated transaction with the mobile device 1101.

FIG. 20 is a flow chart showing an alternative embodiment of a method 1800 for validating a touchscreen stylus interaction. A software application program 1250 on the mobile device 1101 is launched in step 1810. The software application 1250 is preferably a dedicated application that requires validated signature input from a registered touchscreen stylus 1130. In step 1820, the software application program 1250 causes the touchscreen 1120 to temporarily disable touchscreen input. In the preferred embodiment, the touchscreen input interface 1225 is not deactivated, but the software 1250 does not accept touch input data 1160 in at least a portion of the touchscreen area 1150. In step 1822, a stylus ID 1375 is wirelessly received from the wireless transmitter 1330 of the stylus 1130. In step 1830, the stylus 1130 initiates a touch interaction with the mobile device touchscreen 1120. The interaction may be a voltage pulse interaction in which a pulse generator 1340 transmits a voltage pulse 1376.

In step 1835, a feedback signal detector 1370 in the stylus 1130 receives an indication from the stylus tip 1135 that the stylus tip 1135 is contacting the surface of the touchscreen 1120. The feedback signal detector 1370 may determine that the stylus tip 1135 is interacting with a capacitive touchscreen 1120 by detecting a change in the capacitance at the stylus tip 1135. Alternatively, the feedback signal generator 1370 could be a pressure sensor that detects that the stylus tip 1135 is exerting pressure on the touchscreen 1120.

In step 1840, the stylus initiates a "write" signal that is transmitted wirelessly from the stylus 1130 via a wireless interface 1330. The write signal is received by a wireless interface 1230 the mobile device 1101. In step 1850, in response to the write signal received from the stylus 1130, the software application program 1250 allows touch input data 1160 to be received by the touch input interface 1225.

In step 1860, the touch input interface 1225 receives touch interaction data 1160, such as a signature or other input from the stylus tip 1135. In step 1870, the stylus tip 1135 discontinues the touch interaction with the touchscreen 1120 by discontinuing contact with the touchscreen 1120. The feedback signal detector 1370 inside of the stylus 1130 will then sense that the tip 1135 is no longer contacting the touchscreen 1120. In response, the stylus wireless interface 1130 sends an end-write signal that is received by the wireless interface 1230 of mobile device 1101 in step 1880. In step 1890 the touchscreen 1120 is once again disabled by the software application 1250 in response to the end-write signal.

In one embodiment, the write signal is a continuous signal that is sent whenever the stylus tip 1135 is contacting the touchscreen 1120. In this case, the end-write signal is simply the discontinuation of the write signal; when the software 1250 running on the mobile device 1101 determines that the write signal is not being sent by the stylus 1130, the software 1250 on the mobile device 1101 causes the touchscreen 1120 to be disabled. In an alternative embodiment, the write signal can be a discrete one-time signal sent by the wireless transmitter 1330, and the end-write signal would be a second discrete signal.

In an alternative embodiment of the method 1800, if the stylus 1130 is a grip-enabled stylus such as that shown and described in relation to FIGS. 1-10, the write signal could be initiated in response to the user correctly gripping the stylus 100 with a tripod grip to contact three designated buttons 150 on the stylus shaft 125. In this case, the write signal would be transmitted wirelessly in response to all three buttons 150 being contacted simultaneously, and the end-write signal would be transmitted when not all three buttons 150 are contacted simultaneously.

The many features and advantages of the invention are apparent from the above description. Numerous modifications and variations will readily occur to those skilled in the art. For example, the grip-enabled stylus could be altered to have only one button or two buttons to activate the stylus tip. Since such modifications are possible, the invention is not to be limited to the exact construction and operation illustrated and described. Rather, the present invention should be limited only by the following claims.

What is claimed is:

1. A touchscreen input validation system comprising:
    a) a touch-enabled device having
        i) a display screen,
        ii) a touchscreen input interface for receiving touch input data,
        iii) a device wireless data receiver,
        iv) a device processor, and
        v) a tangible, non-transitory device memory;
    b) a touchscreen stylus having
        i) a stylus tip,
        ii) a stylus wireless data transmitter transmitting a first stylus identifier for the touchscreen stylus,
        iii) a pulse generator outputting a first voltage pulse pattern to the stylus tip; and
    c) computer software logic residing on the device memory, the computer software logic programming the device processor to
        i) receive the first stylus identifier via the device wireless data receiver,
        ii) receive the first voltage pulse pattern from the stylus tip via the touchscreen input interface,
        iii) query stylus data records to verify that the first stylus identifier is associated with the first voltage pulse pattern,
        iv) receive touch input data from the stylus tip via the touchscreen input interface, and
        v) store validation information validating that the received touch input data was received from the stylus.

2. The system of claim 1, wherein the stored validation information includes one of an image of the received touch input data and a document of the received touch input data.

3. The system of claim 1, wherein the validation information is stored on the device memory.

4. A method for validating a signature from a touchscreen stylus, the method comprising:
    a) restricting touch input on a touch input interface of a touch-enabled device by not recognizing touch interaction on a first area of the touch input interface;
    b) wirelessly receiving a stylus identifier sent from a wireless transmitter in the touchscreen stylus;
    c) determining a signature voltage pulse pattern associated with the stylus identifier;
    d) enabling the touch input interface to recognize voltage pulse input on the first area of the touch input interface;
    e) receiving a first voltage pulse pattern from a stylus tip at an end of the touchscreen stylus;
    f) determining that the first voltage pulse pattern is the signature voltage pulse pattern associated with the stylus identifier; and
    g) in response to determining that the first voltage pulse pattern is the signature voltage pulse pattern, storing stylus validation information in a tangible, non-transitory computer memory.

5. The method of claim 4, further comprising:
    h) receiving touch input data from the stylus tip at the touch input interface; and
    i) storing the touch input data with the stylus validation information in the computer memory.

6. The method of claim 5, wherein the stylus validation information comprises the stylus identifier and the touch input data.

7. The method of claim 4, further comprising:
   h) receiving an electronic request, via a data network, to view the stylus validation information; and
   i) sending the stylus validation information over the data network in response to the electronic request.

8. The method of claim 4, wherein the step of determining a signature voltage pulse pattern associated with the stylus identifier includes using the stylus identifier as a query term to query a database containing a plurality of different stylus identifiers, and further wherein each of the plurality of stylus identifiers in the database is associated with a different signature voltage pulse pattern.

9. The method of claim 8, wherein the computer memory storing the stylus validation information is located on a remote server accessible over a data network, and further wherein the database containing the plurality of stylus identifiers is stored on the computer memory.

10. The method of claim 8, further comprising:
    h) determining that the stylus identifier received in step b) is not contained within the database;
    i) storing the stylus identifier as a new record in the database; and
    j) associating the first voltage pulse pattern with the stylus identifier in the database.

11. The method of claim 4, wherein the first voltage pulse pattern is a time-dependent voltage transition pattern that is continuously repeated.

12. A method for validating a touchscreen stylus comprising:
    a) receiving a stylus identifier;
    b) determining a signature voltage pulse pattern associated with the stylus identifier;
    c) receiving a first voltage pulse pattern from a tip of the touchscreen stylus;
    d) matching the first voltage pulse pattern to the signature voltage pulse pattern associated with the stylus identifier; and
    e) in response to the matching step, validating the stylus.

13. The method of claim 12, wherein the step of receiving the first voltage pulse pattern from the tip of the touchscreen stylus further comprises simultaneously receiving touchscreen input data from the tip of the stylus.

14. The method of claim 13, wherein the step of validating the stylus further comprising generating validation information, and further comprising storing the validation information along with touchscreen input data in a digital data store.

15. The method of claim 14, wherein the validation information comprises a stylus identifier and an image formed by the touchscreen input data.

16. The method of claim 12, further comprising receiving a write signal when the tip of the touchscreen stylus is contacting a surface.

* * * * *